United States Patent
Kur

(10) Patent No.: US 6,902,345 B2
(45) Date of Patent: Jun. 7, 2005

(54) BALL JOINT

(75) Inventor: Jaromir Kur, Ingolstadt (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/483,970

(22) PCT Filed: May 10, 2002

(86) PCT No.: PCT/EP02/05133

§ 371 (c)(1),
(2), (4) Date: Jan. 16, 2004

(87) PCT Pub. No.: WO03/014585

PCT Pub. Date: Feb. 20, 2003

(65) Prior Publication Data

US 2004/0202507 A1 Oct. 14, 2004

(30) Foreign Application Priority Data

Aug. 10, 2001 (DE) ........................ 101 39 564

(51) Int. Cl.$^7$ ............................................. F16B 5/00
(52) U.S. Cl. ................................................. 403/135
(58) Field of Search .......................... 403/135, 122, 403/140

(56) References Cited

U.S. PATENT DOCUMENTS

| | | | |
|---|---|---|---|
| 2,876,029 A | | 3/1959 | Latzen |
| 3,602,560 A | | 8/1971 | Memmel |
| 3,650,004 A | * | 3/1972 | Bergstrom ............... 403/140 X |
| 5,152,628 A | | 10/1992 | Broszat et al. |
| 5,609,433 A | | 3/1997 | Pazdirek et al. |
| 5,641,235 A | | 6/1997 | Maughan et al. |
| 6,505,990 B1 | * | 1/2003 | Maughan .................. 403/135 |
| 2003/0081989 A1 | * | 5/2003 | Kondoh .................... 403/135 |
| 2004/0037621 A1 | * | 2/2004 | Suzuki et al. ............. 403/135 |

FOREIGN PATENT DOCUMENTS

| | | |
|---|---|---|
| DE | 32 22 308 A1 | 1/1983 |
| DE | 42 26 986 A1 | 2/1994 |
| FR | 1057016 | 10/1953 |

* cited by examiner

Primary Examiner—John R. Cottingham
(74) Attorney, Agent, or Firm—Stevens, Davis, Miller & Mosher, LLP

(57) ABSTRACT

The invention relates to a ball joint (10), particularly for chassis parts of motor vehicles, comprising a joint housing (12), at least one bearing seat (14) and one pivot pin (18) with a joint ball (16), which is mounted inside the bearing seat, and comprising a sealing cup (22) between the pivot pin and the housing, whereby the pivot pin is made of steel and the housing is made of a material having a low modulus of elasticity. Reinforcements (32, 34) made of a higher strength material, particularly also of steel, are placed inside the housing in order to provide the ball joint with a stronger construction.

5 Claims, 1 Drawing Sheet

BALL JOINT

The invention relates to a ball joint, in particular for parts of the chassis of motor vehicles, as specified in the claims.

BACKGROUND OF THE INVENTION

A ball joint such as this is described in DE 40 32 541 A1; in this ball joint the pivot pin with joint ball is made of steel and the housing of the joint of a material possessing a significantly lower modulus of elasticity, specifically, a plastic. However, ball joints have also been disclosed in which the joint housing consists of a light metal alloy, as for example in the case of joints integrated into vehicle chassis parts such as suspension arms and the like.

SUMMARY OF THE INVENTION

The object of the invention is to propose a generic ball joint of more rugged design at small additional cost.

It is claimed for the invention that this object is attained by the features specified in the independent claim. Advantageous developments of the invention are specified in the additional claims.

It is claimed for the invention that use is made in the housing of reinforcing elements of a material of higher strength, in particular also of steel, one which ensures increased strength and durability for the ball joint, in a motor vehicle, for example, when the vehicle rolls over a curb.

The reinforcing elements may be in the form of pins which may be inserted, poured, injected, etc., into the joint housing, depending on the material.

By preference the reinforcing elements are oriented so that they are positioned in the direction of application of the primary load to the joint opposite the joint ball and accordingly represent an excellent housing reinforcement and overload safety factor.

The ball joint may be configured to particularly great advantage in such a way that the reinforcing elements additionally perform an emergency operation function even in the event of advanced wear of the joint such that they come into direct contact with the joint ball, for example, when steel slides on steel.

BRIEF DESCRIPTION OF THE DRAWING

An exemplary embodiment of the invention is described in detail in what follows. The drawing illustrates a longitudinal section along the central axis of a ball joint having a housing of an aluminum alloy and reinforcing elements of steel mounted in the housing.

DETAILED DESCRIPTION OF THE INVENTION

Figure 1:
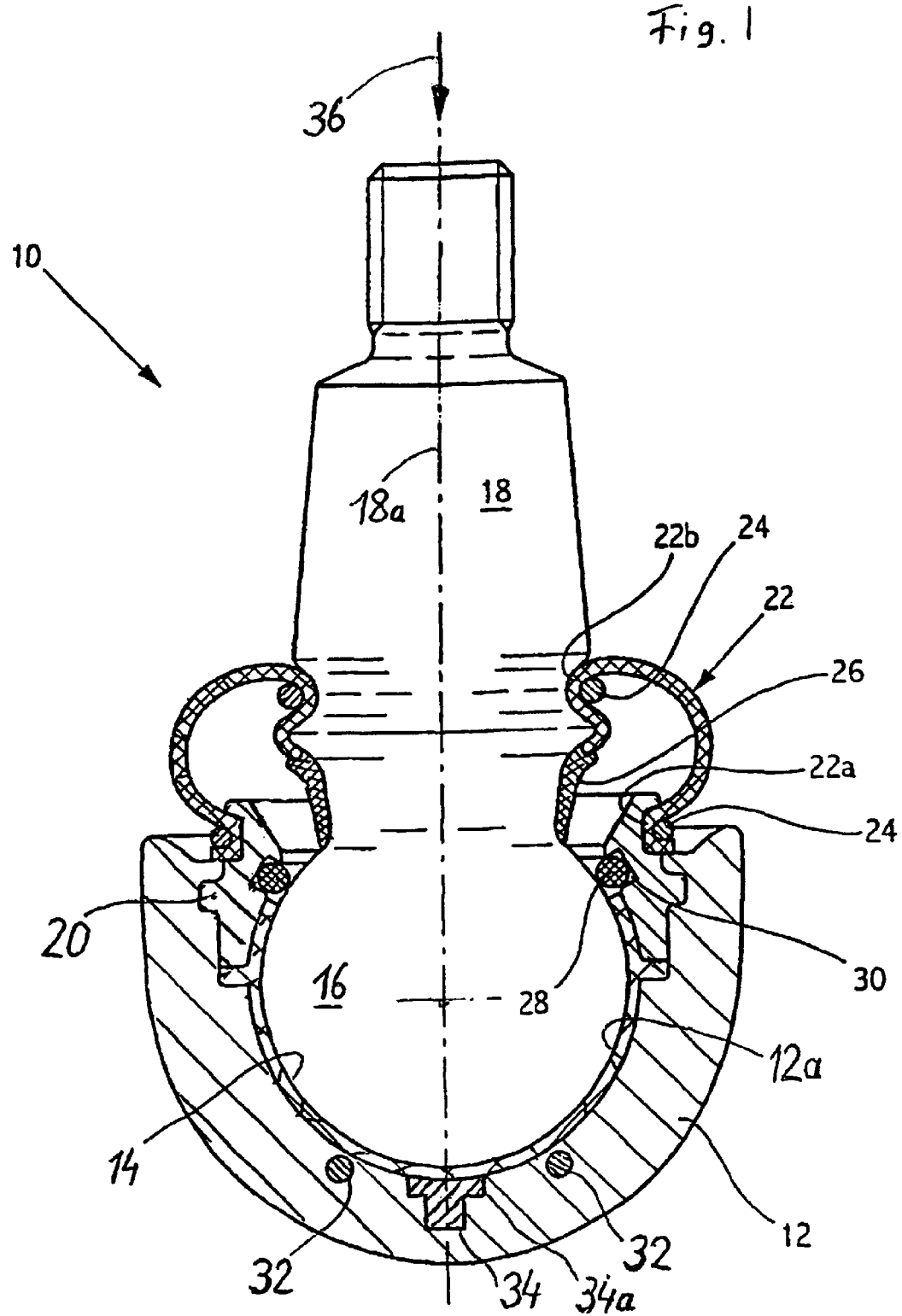

The ball joint 10 shown in the drawing consists essentially of a housing 12, a bearing seat 14, a joint ball 16 with a pivot pin 18 molded on it, a retaining ring 20 rigidly connected to the housing 12, and a flexible-rubber sealing cup 22. Except as otherwise described, the ball joint 10 is of conventional design.

The ball joint 10 and accordingly the interior of the joint are sealed off by the sealing cup 22, which is pressed tightly by means of clamping rings 24 against the annular sealing lip 22a on the side of the housing and against the also annular sealing lip 22b for the pivot pin 18. A spacer ring 26 is mounted by conventional means in the area between the joint ball 16 and the pivot pin 18.

The joint ball 16 is mounted pivotably and rotatably in the dome-shaped bearing seat 14; the bearing seat 14 may also be made up of several elements (in accordance with disclosed ball joint configurations).

A flexible rubber sealing ring 28 (a so-called O-ring) is mounted in an annular groove 30 in the retaining ring 20 as a second sealing element of the ball joint 10; this sealing ring 28 is an element which seals the area below the sealing ring 28 between joint ball 16, bearing seat 14, and housing 12. A suitable lubricant or joint grease is, of course, introduced into the area situated below the sealing cup 22.

The joint ball 16 with pivot pin 18 is made of steel with a high modulus of elasticity and is mounted in the bearing seat 14. The bearing seat 14 is, of course, made of a suitable plastic bearing material.

The housing 12 of the ball joint 10, with a lower modulus of elasticity, is made of an aluminum alloy.

Reinforcing elements 32, 34 also made of steel having a higher modulus of elasticity are introduced into the more or less cupshaped housing 12 of the ball joint 10.

The pins 32 pressed more or less vertically to the pivot pin central axis 18a into corresponding holes in the housing 12 are mounted so that they are situated opposite each other in the direction of application of the primary load (arrow 36) on the joint ball 16 and are positioned relatively near the dome-shaped recess 12a in the housing.

In addition or as an alternative, the pin 34, also of steel, is introduced as a reinforcing element into a corresponding hole in the housing 12, the central axis of which pin is oriented more or less along the extended pivot pin central axis 18a and more or less vertically relative to the center of the joint ball 16. There is mounted on the pin 34 a head 34a of greater diameter the frontal surface of which facing the bearing seat 14 is shaped so as to be of a concavity corresponding to the radius of the joint ball 16.

In addition to the pins 32, 34 as elements reinforcing and stiffening the housing 12, the reinforcing elements 32, 34 can also ensure performance of an emergency operating function of the ball joint 10 in the event of extreme wear of this joint.

The invention is not limited to the exemplary embodiment illustrated. In place of the two pins 32 additional pins 32 may also be provided which may be oriented either vertically relative to the plane of the drawing (as illustrated) or, for example, at an angle to such plane. The pin 34 may be provided in addition or as an alternative, but a plurality of pins 34 may also be mounted around the center of the ball joint. Other reinforcing elements such as ones of sintered materials, ceramic materials, and so forth may also be used in place of steel reinforcing elements.

The housing 12 may also be produced by conventional means of plastic, if necessary with fiber reinforcement.

What is claimed is:

1. A ball joint comprising:
   a housing having a longitudinal centerline and a bearing seat surface provided with a center of curvature on said centerline;
   a member having a modulus of elasticity greater than that of said housing, including a ball portion seated on said bearing seat surface and a stud portion; and
   at least one reinforcing element having a modulus of elasticity greater than that of said housing, embedded in said housing.

2. A ball joint according to claim 1 wherein said reinforcing element is disposed on said housing centerline.

3. A ball joint according to claim 2 wherein said reinforcing element includes a surface forming a continuation of said bearing seat surface.

4. A ball joint according to claim 1 including at least two reinforcing elements disposed on opposite sides of said housing centerline.

5. A ball joint according to claim 3 including at least two reinforcing elements disposed on opposite sides of said housing centerline.

* * * * *